United States Patent
Ghani et al.

(10) Patent No.: US 8,676,730 B2
(45) Date of Patent: Mar. 18, 2014

(54) SENTIMENT CLASSIFIERS BASED ON FEATURE EXTRACTION

(75) Inventors: Rayid Ghani, Chicago, IL (US); Marko Krema, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 321 days.

(21) Appl. No.: 13/179,707

(22) Filed: Jul. 11, 2011

(65) Prior Publication Data

US 2013/0018824 A1   Jan. 17, 2013

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | | |
|---|---|---|---|
| 5,146,405 A * | 9/1992 | Church | 704/9 |
| 7,752,119 B2 * | 7/2010 | Ghani et al. | 705/37 |
| 7,752,120 B2 * | 7/2010 | Ghani | 705/37 |
| 7,904,378 B2 * | 3/2011 | Ghani et al. | 705/37 |
| 7,945,473 B2 * | 5/2011 | Fano et al. | 705/14.1 |
| 7,970,767 B2 * | 6/2011 | Probst et al. | 707/739 |
| 7,996,440 B2 * | 8/2011 | Probst et al. | 707/803 |
| 8,027,941 B2 * | 9/2011 | Probst et al. | 706/14 |
| 8,117,199 B2 * | 2/2012 | Ghani et al. | 707/734 |
| 8,417,653 B2 * | 4/2013 | Probst et al. | 706/14 |
| 8,504,492 B2 * | 8/2013 | Ghani et al. | 706/12 |
| 2003/0187702 A1 | 10/2003 | Bonissone et al. | |
| 2012/0310996 A1 | 12/2012 | Kulack et al. | |
| 2013/0018651 A1 | 1/2013 | Djordjevic et al. | |
| 2013/0018825 A1 | 1/2013 | Ghani et al. | |

OTHER PUBLICATIONS

Sentiment analysis of online product reviews with Semi-supervised topic sentiment mixture model, Wei Wang Fuzzy Systems and Knowledge Discovery (FSKD), 2010 Seventh International Conference on, vol. 5 Digital Object Identifier: 10.1109/FSKD.2010.5569528, Publication Year: 2010, pp. 2385-2389.*
Search Report issued in EP 11305901.8 on Jan. 2, 2012.
Qiaozhu Mei, et al.: "Topic Sentiment Mixture: Modeling Facets and Opinions in Weblogs", WWW 2007/ Track: Data Mining, May 12, 2007, pp. 171-180, XP55015419.
"Joint Sentiment/Topic Model for Sentiment Analysis", Lin, C. and He, Y., CIKM '09, Nov. 2-6, 2009, Hong Kong, China.

(Continued)

*Primary Examiner* — Michael B Holmes
(74) *Attorney, Agent, or Firm* — Harrity & Harrity, LLP

(57) ABSTRACT

Method and apparatus are provided for providing one or more sentiment classifiers from training data using supervised classification techniques based on features extracted from the training data. Training data includes a plurality of units such as, but not limited to, documents, paragraphs, sentences, and clauses. A feature extraction component extracts a plurality of features from the training data, and a feature value determination component determines a value for each extracted feature based on a frequency at which each feature occurs in the training data. On the other hand, a class labeling component labels each unit of the training data according to a plurality of sentiment classes to provide labeled training data. Thereafter, a sentiment classifier generation component provides a least one sentiment classifier based on the value of each extracted feature and the labeled training data using a supervised classification technique.

27 Claims, 6 Drawing Sheets

(56) References Cited

OTHER PUBLICATIONS

Breese et al., "Decision-Theoretic Case-Based Reasoning", IEEE Transactions on Systems, vol. 26, No. 6, pp. 838-842 (1996).

Cao, "Model Selection Based on Expected Squares Hellinger Distance", ProQuest Dissertation and Theses, 2007, 4 pages.

Smyth et al., "Hierarchical Case-Based Reasoning Integrating Case-Based and Decompositional Problem-Solving Techniques for Plant-Control Software Design", IEEE Transactions on Knowledge and Data Engineering, vol. 13, No. 5, pp. 793-812 (2001).

* cited by examiner ize) to provide labeled training data. Thereafter, a sentiment classifier generation component provides a least one sentiment classifier based on the value of each extracted feature and the labeled training data using a supervised classification technique, for example, support vector machines (SVM). In this manner, the instant disclosure provides techniques for building statistical classification classifiers (models) from natural language for sentiment analysis in an automated fashion. In this manner, the resulting models may be used to more accurately assess sentiment in documents being analyzed based thereupon.

SENTIMENT CLASSIFIERS BASED ON FEATURE EXTRACTION

CROSS-REFERENCE TO RELATED APPLICATIONS

The instant application is related to a co-pending application having Ser. No. 13/179,741 filed on even date herewith.

FIELD

The instant disclosure relates generally to statistical machine learning techniques and, in particular, to the use of feature extraction in sentiment analysis.

BACKGROUND

Sentiment analysis, also known as opinion mining, refers to the application of natural language processing, computational linguistics, and text analytics to identify and extract subjective information in source materials. Generally speaking, sentiment analysis aims to determine the attitude of a writer or a speaker, with respect to some topics or the overall tonality of a document. The attitude may be his or her judgment or evaluation, emotional state when writing or speaking, or the intended emotional communication that the author wishes to have on the reader or audience. A basic task in sentiment analysis is classifying the polarity of a given text at the document, paragraph, or sentence level—whether the expressed opinion in a document, a paragraph, or a sentence is positive, negative, or neutral. Processing of online consumer reviews is one example of the applications of sentiment analysis. Online retailers want to obtain feedback about their products from the reviews posted by various users, thereby requiring an effective method to determine users' attitudes toward their products based on a large amount of natural language documents (e.g., consumer reviews).

It is known to perform automated sentiment analysis of natural language documents by computers using data mining techniques such as latent semantic analysis, support vector machines (SVM), "bag of words" (i.e., dictionary), and semantic orientation-pointwise mutual information (SO-PMI). For example, known methods utilize "bag of words" to look for words in the documents that fall into certain sentiment categories and determine the sentiment class for each document based on the number of words found in the "bag of words". However, since the meaning of a specific word or phrase and its associated sentiment class may change depending on its linguistic category (e.g., non, verb, adjective, etc.) or may change in conjunction with any negation/inversion elements around the word or phrase, the efficiency and accuracy of those known methods could be further improved.

SUMMARY

The instant disclosure describes techniques for providing one or more sentiment classifiers from training data (e.g., documents, contexts around a phrase) using supervised classification techniques based on features extracted from the training data. Training data is provided that includes a plurality of units such as, but not limited to, documents, paragraphs, sentences, and clauses. A feature extraction component extracts a plurality of features from the training data, and a feature value determination component determines a value for each extracted feature based on a frequency at which each feature occurs in the training data. On the other hand, a class labeling component labels each unit of the training data according to a plurality of sentiment classes (e.g., positive, negative) to provide labeled training data. Thereafter, a sentiment classifier generation component provides a least one sentiment classifier based on the value of each extracted feature and the labeled training data using a supervised classification technique, for example, support vector machines (SVM). In this manner, the instant disclosure provides techniques for building statistical classification classifiers (models) from natural language for sentiment analysis in an automated fashion. In this manner, the resulting models may be used to more accurately assess sentiment in documents being analyzed based thereupon.

In an embodiment, more than one sentiment classifiers are provided based on a plurality of sets of training data that are associated with a plurality of subjects, and each sentiment classifiers is associated with one of the plurality of subjects. A taxonomy of sentiment classifiers such as, but not limited to, a tree taxonomy or a web taxonomy is provided based on the subject associated with each sentiment classifier. For example, to provide the taxonomy, at least some of the plurality of sentiment classifiers may be aggregated to form another sentiment classifier based on the subjects associated with those sentiment classifiers. In this manner, for any new data to be analyzed, all applicable sentiment classifiers from the taxonomy can be more readily identified based on the subject associated with the new data, thereby increasing the speed with which such new data is analyzed.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION

Figure 1:
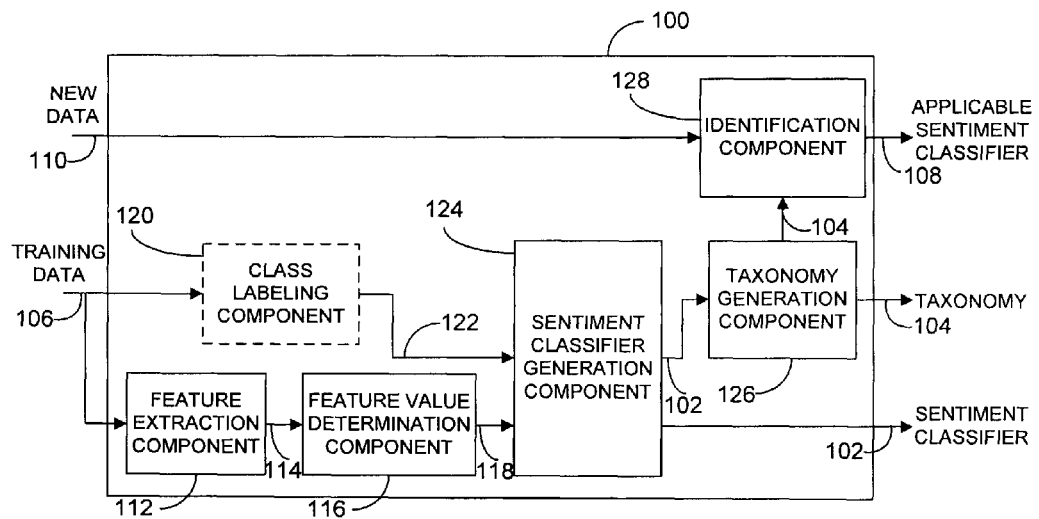
FIG. 1 is a block diagram of an apparatus for providing sentiment classifiers based on a plurality of features in accordance with the instant disclosure.

Referring now to FIG. 1, an apparatus 100 for providing sentiment classifiers based on a plurality of features is illustrated. More particular, the apparatus 100 is used to provide one or more sentiment classifiers 102 and/or taxonomy of sentiment classifiers 104 as output based on its input of training data 106. Additionally or optionally, the apparatus 100 may also output one or more applicable sentiment classifiers 108 for any new data 110 for sentiment analysis. As shown, the apparatus 100 includes a feature extraction component 112. The feature extraction component 112 is provided to operate upon the training data 106 and to extract a plurality of features 114 from the training data 106 using techniques describe in further detail below.

The training data 106 may include a plurality of units such as, but not limited to, multiple natural language documents that describe one or more products in consumer generated media. As used herein, a natural language document comprises any document that at least textually describes a subject using virtually any language syntax normally used by, and intended for consumption by, humans, either orally or in written form, when describing something. As such, a natural language document may be expressed in any language. Furthermore, natural language documents as used herein may include unstructured, semi-structured, or structured documents as known in the art. In a most general sense, a subject may include anything that may be described using a natural language document and, in an embodiment, includes any object or service that is made available by a supplying entity (e.g., retailers, manufacturers, etc.) for use by interested consumers, i.e., a product. For instance, it is anticipated that the disclosed systems and methods may be beneficially applied to retailers or other commercial enterprises that offer an array of merchandise and/or services for sale. However, the disclosed systems and methods need not be limited to commercial contexts and may be beneficially applied to any domain where it would be advantageous to gain insight into things described in natural language documents.

The training data 106 may be provided in various manners. For example, in an embodiment, pre-compiled databases of the training data 106 may be employed. For example, the training data 106 may be manually provided by a user or a third party human expert in a database. In another embodiment, the training data 106 may be automatically collected from various sources. For example, the natural language documents describing products are available via a public communications network such as the World Wide Web in the form of textual content in web pages residing on one or more web servers. Web servers are well known to those having skill in the art. A so-called web crawler (i.e., a computer-executed program that visits remote sites and automatically downloads their contents) may programmed to visit websites of relevant entities (e.g., retailers, manufacturers, etc.) and extract names, Uniform Resource Locators, descriptions, prices, and categories of all products available. Such a web crawler may be programmed to automatically extract information or, in a simpler implementation, manually configured to extract specific information. As the web crawler collects suitable information, they are stored in a database for subsequent use. Of course, sources of documents other than web sites, such as internal databases or other non-publicly accessible sources may be equally employed. Further, the documents are not restricted to types typically found in web sites, e.g., HTML pages, but may include other document types such as text files, "MICROSOFT" Office documents, etc.

Regardless of the manner in which the training data 106 is obtained, the training data 106 is provided to the feature extraction component 112 so that a plurality of features 114 can be extracted from the training data 106. As used herein, "features" refer to any attributes identified from each unit of the training data 106 that have weights in sentiment analysis, as described in greater detail below. Examples of features include but are not limited to individual words (e.g., "great"), bigrams (e.g., "great player"), part-of-speech (POS, e.g., great_adj, player_noun), parses (e.g., noun phrases, verb phrases, sentence structure), dictionary lookups (e.g., positive_dictionary), negation/inversion (e.g, negated_great), rules (e.g., is a real number, is a positive emoticon), and global features that apply to document or sentence as a whole (e.g., contains positive and negative words, has been previously classified as a complaint, is part of the review collection). Multiple functions such as, but not limited to, a dictionary, PoS determination, and negation/inversion may be applied by the feature extraction component 112 to extract the features 114 from the training data 106. Stated another way, the feature extraction component 112 may provide a standard bag of words format used in text processing augmented by other functions, for example, natural language rules (PoS, negation/inversion, etc.) that are used in sentiment analysis.

The apparatus 100 may include a feature value determination component 116 operatively connected to the feature extraction component 112 and operate upon the features 114 extracted by the feature extraction component 112. In an embodiment, feature value determination component 116 is operable to determine a value for each feature of the plurality of features 114 based on a frequency at which each feature occurs in the training data 106. The range of the values is arbitrary and may be, for example, from −10 to +10 in one example. As a result, a plurality of feature-value pairs 118 are provided collectively by the feature extraction component 112 and the feature value determination component 116. It is understood that the functions of the feature extraction component 112 and the feature value determination component 116 may be combined and achieved by a single component if desired. In other words, the value of each feature 114 may be determined immediately at the time when the feature 114 is being extracted.

As discussed previously, the training data 106 includes a plurality of units and may be provided manually in databases or collected automatically. In case the training data 106 is provided in a database, it is preferable that each unit of the training data 106 is labeled according to a plurality of sentiment classes, such as "positive", "negative", or "neutral", based on the content of each unit of the training data 106 by a user or a third party human expert. In case the training data 106 is automatically collected, the apparatus 100 may optionally include (as indicated by the dashed lines) a class labeling component 120 operable to apply one or more existing sentiment classifiers to each unit of the training data 106 to provide a sentiment score for each unit of the training data 106 and then label each unit of the training data 106 with one sentiment class based on their sentiment scores. Nevertheless, the training data 106 becomes labeled training data 122 regardless whether the labeling operation is done manually or automatically.

The apparatus 100 includes a sentiment classifier generation component 124 operatively connected to the feature value determination component 116 and configured to receive the labeled training data 122 (including via the class labeling component 120, if provided). The sentiment classifier generation component 124 is provided to operate upon the plurality of feature-value pairs 118 and the labeled training data 122 and to provide the at least one sentiment classifier 102. The sentiment classifier generation component 124 treats the problem of generating sentiment classifiers 102 as a statistical classification problem and, therefore, employs one or more supervised learning algorithms (e.g., supervised statistical classification techniques) for this purpose. As known in the art, supervised learning is the machine learning task of inferring a function from supervised (i.e., labeled) training data. A supervised learning algorithm analyzes the labeled training data and produces an inferred function, in this case, a classifier. In the case of the instant application, the classes are sentiment classes such as "positive", "negative", or "neutral", and the inferred functions are sentiment classifiers 102 for sentiment analysis.

The apparatus 100 may also include a taxonomy generation component 126 operatively connected to the sentiment classifier generation component 124. If more than one sentiment classifiers 102 are provided, these sentiment classifiers 102 may be subsequently provided to the taxonomy generation component 126. The taxonomy generation component 126 is operable to provide a taxonomy of sentiment classifiers 104 based on the relevancy of subjects associated with each sentiment classifier 102. In one embodiment, the taxonomy generation component 126 associates each sentiment classifier 102 with one of the plurality of subjects and then provides a taxonomy of sentiment classifiers 104 based on the subject associated with each sentiment classifier 102. As described in greater detail below, various types of taxonomy may be provided by the taxonomy generation component 126.

The taxonomy of sentiment classifiers 104 can facilitate the sentiment analysis for new data 110 by providing one or more applicable sentiment classifiers 108 to the new data 110 based on its associated subject. The apparatus 100 may also include an identification component 128 operable to ascertain a subject for the new data 110 and to traverse the taxonomy of sentiment classifiers 104 to find all the applicable sentiment classifiers 108 for the new data 101 to be analyzed. Techniques for automatically detecting one or more topics in a body of text are well known in the art. For example, latent semantic indexing and clustering techniques can provide previously un-specified topics as known in the art.

Figure 2:
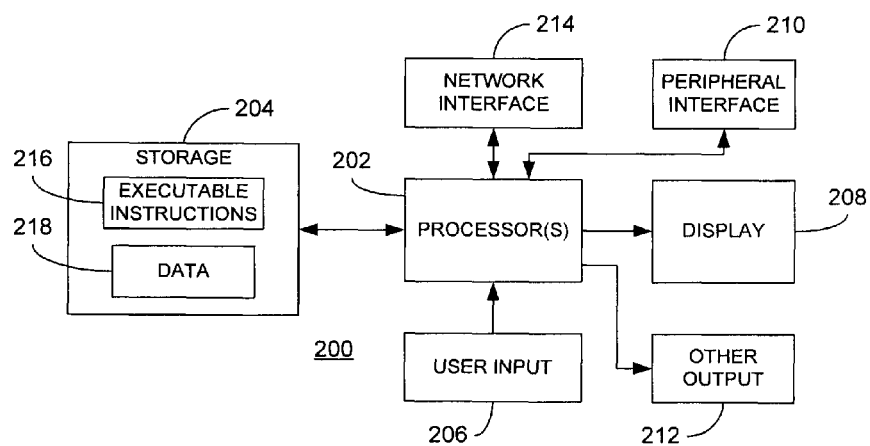
FIG. 2 is a block diagram of a processing device that may be used to implement various embodiments in accordance with the instant disclosure.

In an embodiment, the apparatus 100 illustrated in FIG. 1 is implemented using one or more suitably programmed processing devices, such as the processing device 200 illustrated in FIG. 2. The processing device 200 may be used to implement, for example, one or more components of the apparatus 100, as described in greater detail below with reference to FIGS. 4 and 5. Regardless, the processing device 200 includes a processor 202 coupled to a storage component 204. The storage component 204, in turn, includes stored executable instructions 216 and data 218. In an embodiment, the processor 202 may include one or more devices such as a microprocessor, microcontroller, digital signal processor, or combinations thereof capable of executing the stored instructions 216 and operating upon the stored data 218. Likewise, the storage component 204 may include one or more devices such as volatile or nonvolatile memory including but not limited to random access memory (RAM) or read only memory (ROM). Further still, the storage component 204 may be embodied in a variety of forms, such as a hard drive, optical disc drive, floppy disc drive, etc. Processor and storage arrangements of the types illustrated in FIG. 2 are well known to those having ordinary skill in the art, for example, in the form of laptop, desktop, tablet, or server computers. In one embodiment, the processing techniques described herein are implemented as a combination of executable instructions and data within the storage component 204.

As shown, the processing device 200 may include one or more user input devices 206, a display 208, a peripheral interface 210, other output devices 212, and a network interface 214 in communication with the processor 202. The user input device 206 may include any mechanism for providing user input to the processor 202. For example, the user input device 206 may include a keyboard, a mouse, a touch screen, microphone, and suitable voice recognition application or any other means, whereby a user of the processing device 200 may provide input data to the processor 202. The display 208 may include any conventional display mechanism such as a cathode ray tube (CRT), flat panel display, or any other display mechanism known to those having ordinary skill in the art. In an embodiment, the display 208, in conjunction with suitable stored instructions 216, may be used to implement a graphical user interface. Implementation of a graphical user interface in this manner is well known to those having ordinary skill in the art. The peripheral interface 210 may include the hardware, firmware and/or software necessary for communication with various peripheral devices, such as media drives (e.g., magnetic disk or optical disk drives), other processing devices, or any other input source used in connection with the instant techniques. Likewise, the other output device(s) 212 may optionally include similar media drive mechanisms, other processing devices, or other output destinations capable of providing information to a user of the processing device 200, such as speakers, LEDs, tactile outputs, etc. Finally, the network interface 214 may include hardware, firmware, and/or software that allows the processor 202 to communicate with other devices via wired or wireless networks, whether local or wide area, private or public, as known in the art. For example, such networks may include the World Wide Web or Internet, or private enterprise networks, as known in the art.

Figure 3:
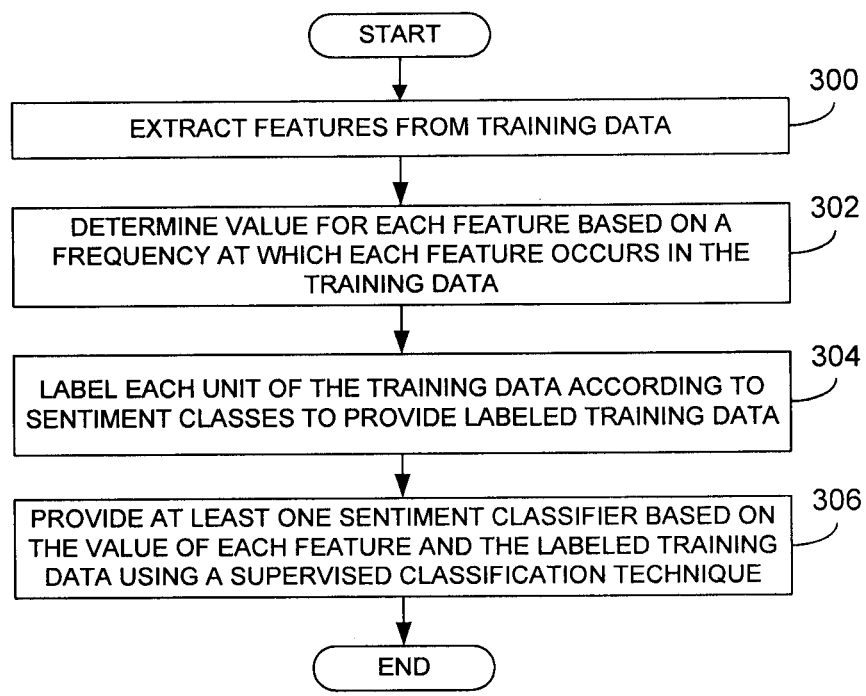
FIG. 3 is a flow chart illustrating a method for providing sentiment classifiers in accordance with the instant disclosure.

Referring now to FIG. 3, a flow chart illustrating a method for providing sentiment classifiers in accordance with the instant disclosure is provided. While the processing device 200 is a form for implementing the processing described herein, including those shown in FIGS. 3, 6, and 9, those having ordinary skill in the art will appreciate that other, functionally equivalent techniques may be employed. For example, rather than using a single processing device 200, the functionality described herein may be separated over multiple processing devices. Furthermore, as known in the art, some or all of the functionalities implemented via executable instructions may also be implemented using firmware and/or hardware devices such as application specific integrated circuits (ASICs), programmable logic arrays, state machines, etc. Further still, other implementations of the processing device 200 may include a greater or lesser number of components than those illustrated. Once again, those of ordinary skill in the art will appreciate the wide number of variations that may be used is this manner.

Beginning at block 300, a plurality of features are extracted from the training data, which includes a plurality of units, such as but not limited to, documents, paragraphs, sentences, clauses, or contexts around a phrase. Furthermore, as described below with reference to FIGS. 4 and 6, the features extracted at block 300 may be determined in accordance with techniques for determining parts-of-speech tags, performing dictionary lookups and negation/inversion determinations. As described above, this may be performed by the feature extraction component 112 implemented by the processing device 200. At block 302, processing may continue where a value for each extracted feature is determined based on a frequency at which each extracted feature occurs in the training data. For example, the well-known term frequency-inverse document frequency (TF-IDF) method may be applied to determine the frequency at which each extracted feature occurs in the training data. In one embodiment, three counters are kept for each extracted feature: (1) a TF counter stores the times that the extracted feature occurs in each unit of the training data; (2) a IDF counter stores the number of units in the training data in which the extracted feature occurs; and (3) a counter stores the length of the unit of the training data, which may be used to normalize the frequency if desired. Because features that only occur in one specific unit of the training data should be weighted more heavily than features that occur in many different units of the training data, in one example, the value of the extracted feature may be calculated by dividing the number in TF counter by the log of the number in IDF counter. Other frequency-based techniques may be employed to derive the various values for the extracted features. As described above, block 300 may be performed by the feature value determination component 116 implemented by the processing device 200 using any known techniques in the art. In other examples, however, it is understood that the value of each extracted feature may be determined by the feature extraction component 112 alone or in conjunction with the feature value determination component 116. That is, the value of extracted each feature may be determined immediately at the time when the features are being extracted from the training data. Regardless, processing continues to block 304 where each unit of the training data is labeled according to a plurality of sentiment classes, for example, "positive", "negative", and "neutral", to provide labeled training data. It is understood that block 304 may be processed prior to block 300 and/or 302. For example, the labeled training data may be provided before the features are extracted from the training data. As described before, the sentiment classes may be manually labeled to each unit of the training data by a user or a human expert or may be automatically labeled through one or more existing sentiment classifiers by the class labeling component 120 implemented by the processing device 200. Proceeding to block 306, at least one sentiment classifier is provided based on the value of each extracted feature and the labeled training data using a supervised classification technique, for example, the SVM method. As described above, this may be performed by the sentiment classifier generation component 124 implemented by the processing device 200.

Figure 4:
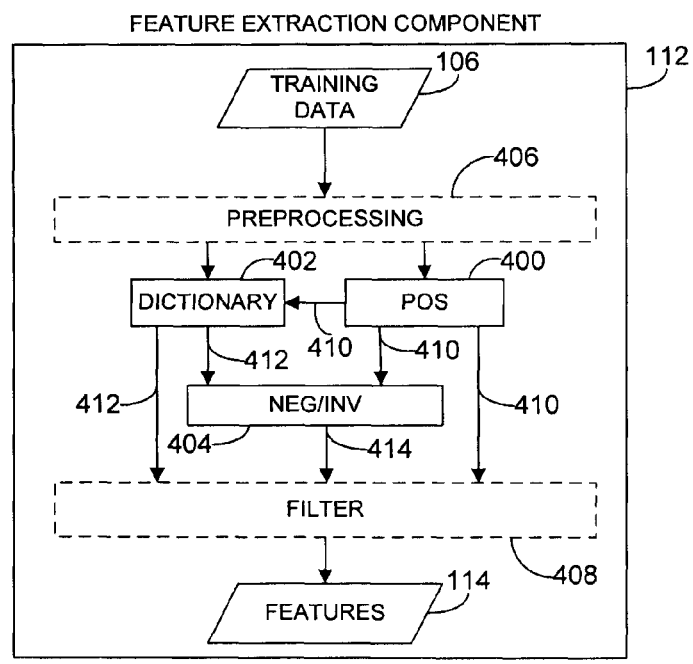
FIG. 4 is a block diagram illustrating the feature extraction component of FIG. 1 in greater detail in accordance with the instant disclosure.

Referring now to FIG. 4, a block diagram of an embodiment of the feature extraction component 112 of FIG. 1 is illustrated in greater detail. In particular, the feature extraction component 112 includes a PoS sub-component 400, a dictionary sub-component 402, and a negation/inversion sub-component 404, which are operatively connected to each other. As indicated by the dashed lines, the feature extraction component 112 may optionally include a preprocessing sub-component 406 operatively connected to the PoS sub-component 400 and the dictionary sub-component 402. The feature extraction component 112 may also optionally include a filter sub-component 408 operatively connected to the PoS sub-component 400, the dictionary sub-component 402, and the negation/inversion sub-component 404.

When provided, the preprocessing sub-component 406 takes as input the training data 106. In an embodiment, the preprocessing sub-component 406 may divide the training data 106 into a plurality of units at different levels, such as but not limited to document, paragraph, sentence, or clause levels. For example, if the training data 106 is divided at the sentence level, sentence identification criteria may be applied to the training data 106 to identify sentences therein, with each identified sentence then being provided as a separate unit. In one example, the sentence identification criteria may include searching the training data 106 for periods (.) followed by zero or more spaces and a capital letter in a subsequent word. When these conditions are met, the text prior to the period may be designated as the end of a sentence, and the word beginning with the capital letter may be designated as the beginning of another sentence. Other sentence identification criteria may be equally employed for this purpose. In this embodiment, each unit of the training data 106 may be separately stored in a suitable storage device or identified within the training data 106 (again, stored in a suitable storage device) by suitable indicia, e.g., markup tags or the like. In another embodiment, the training data 106 received by the feature extraction component 112 may be already divided into multiple units by a user, and thus, the preprocessing sub-component 406 does not need to separate the training data 106 again.

The preprocessing sub-component 406 may also perform other standard preprocessing functions as known in the art. For example, the preprocessing sub-component 406 may clean the training data 106 by replacing numbers with special tokens for cardinal, ordinal, and currency and by transferring abbreviations into their original forms based on, for example, a look-up table. In another example, the preprocessing sub-component 406 may perform a sentiment related substitution dealing with positive and negative "emoticons", e.g., substituting a positive indication in place of a "smiling" emoticon, ":-)", or a negative indication in place of a "frowning" emoticon, ":-(".

Regardless, the (possibly preprocessed) units of the training data 106 are provided to the PoS sub-component 400 and the dictionary sub-component 402. The PoS sub-component 400 is operable to label at least some elements of each unit of the training data 106 according to a plurality of PoS tags to provide a plurality of PoS features 410. The "element" referred herein may be an individual word, phrase, and/or punctuation character in each unit of the training data 106. In an embodiment, the PoS sub-component 400 augments the individual words with PoS tags. In one example, the word "great" may be labeled with a PoS tag of "adj" for adjective, which is an existing PoS feature for all adjectives in the training data 106. In another example, the operation of labeling the word "great" may also provide a new PoS feature of "great_adj", which indicates a word "great" as adjective. Various other PoS tags, as known in the art, may be equally employed. It is understood that the same word or phrase may be labeled with different PoS tags depending on the context. For example, the word "close" may be labeled with a verb tag, an adjective tag, or an adverb tag in different contexts. Regardless, the provided PoS features 410 may be stored in a suitable storage device as part of the extracted features 114 or provided to other sub-components such as the dictionary sub-component 402 and/or the negation/inversion sub-component 404 for later processing.

The dictionary sub-component 402 includes a plurality of predefined dictionaries (i.e., "bags of words", lexicons), for example, a positive dictionary that includes words and/or phrases usually considered as indicia of "positive" feeling and emotion and a negative dictionary that includes words and/or phrases usually considered as indicia of "negative" feeling and emotion. Other possible well-known dictionaries include, but are not limited to, a negation dictionary, an inversion dictionary, a profanity dictionary, an active dictionary, a passive dictionary, a strengthening dictionary, and weakening dictionary. The dictionary sub-component 402 is operable to check at least some elements of each unit of the training data 106 and/or at least some PoS feature of the plurality of PoS features 410 according to the plurality of dictionaries to provide a plurality of dictionary features 412. In the same example mentioned previously, the word "great" is found in the positive dictionary, and thus, a dictionary feature "positive_dictionary" is provided. For example, if this dictionary feature has not been provided yet, it will be added as a new dictionary feature. Otherwise, the value of an existing dictionary feature "positive_dictionary" will be changed accordingly. In addition to the elements in the original training data 106, the dictionary sub-component 402 may also check some or all of the PoS features 410 provided by the PoS sub-component 400, although this is not a requirement. In this case, for example, a PoS feature "great_adj" is also found in the positive dictionary to provide the dictionary feature "positive_dictionary". However, in other examples, some words may be found in one dictionary while its corresponding PoS feature(s) may be found in different predefined dictionaries or in none of the predefined dictionaries, or vice versa. For example, the PoS feature "close_adj" (i.e., the word "close" as adjective) may be found in the strengthening dictionary while the word "close" itself may not be found in any predefined dictionary.

Additionally or optionally, the dictionary sub-component 402 may be operable to compare a number of elements in a positive dictionary and a number of elements in a negative dictionary in each unit of the training data 106 to provide a plurality of positive/negative ratio features. These features are provided, for example, when elements in the positive dictionary and elements in the negative dictionary occur in the same context. For example, if the words "good", "great", and "inferior" occur in the same sentence, a positive/negative ratio (or difference) feature "positive_negative_sentence_diff" may be provided, and the value may be +1. The comparison may be achieved at various levels (e.g., sentence, paragraph, document, etc.) depending on the units of the training data 106.

As described previously, the feature extraction component 112 also includes the negation/inversion sub-component 404. When a word or phrase occurs in a negative context or in an inverted context, it is relevant for sentiment analysis. The negation/inversion sub-component 404 first detects negation/inversion elements in the training data 106 to provide negation/inversion features based on a negation dictionary and an inversion dictionary of the plurality of predefined dictionaries. For instance, the dictionary sub-component 402 may provide dictionary features 412 that are identified based on the negation and inversion dictionaries to the negation/inversion sub-component 404. That is, all the elements labeled with "negation_dictionary" or "inversion_dictionary" are detected by the negation/inversion sub-component 404. Examples of the words in the negation dictionary include, but are not limited to, "not", "non", "no", or "isn't" and the examples of the words in the inversion dictionary include, but are not limited to, "but" and "instead". For example, if the words "not great" occur in the training data 106, the negation/inversion sub-component 404 detects the negation context based on the detection of the negative element "not" and may provide a negation/inversion feature "negation_occurred".

Once the context is detected, the negation/inversion sub-component 404 labels each word and/or phrase after the detected negation/inversion element with a negation/inversion tag to provide a plurality of negated/inverted elements features 414. In the same example mentioned above, once a negative context is detected, the negation/inversion sub-component 404 may label the word "great" after the negation word "not" with a negation tag to provide a new feature "negated_great". Optionally, the labeling process may propagate within a given window, where the number of elements in the propagation window is set by a user and/or based on punctuation, such as a comma (,) or a period (.). For instance, if a sentence recites "This cell phone is not great as I expected.", and the user sets the propagation window having one word, then the negation/inversion sub-component 404 only negates the first word "great" after the negation element "not" to provide a "negated_great" feature but will not negate words after that. However, in the same example, if the propagation window is larger, for example, five words, then the negation/inversion sub-component 404 will negate all the elements (words and/or phrases) that are between the word "not" and the period (.), e.g., "great" and "as I expected", and will provide them as new negation/inversion features, i.e., "negated_great" and "negated_as I expected". In this example, although the propagation window is five words, the negation/inversion sub-component 404 does not negate the fifth word since it is after the period (.) and is considered as irrelevant for the negation word "not". That is, the negation/inversion propagation can be stopped earlier if certain punctuation characters are encountered.

Additionally or optionally, once a negation/inversion operation is performed by the negation/inversion sub-component 404, the related non-negated/inverted features may be removed from the extracted features 114. In the same example above, the words "not great" generates the feature "negated_great" by the negation/inversion sub-component 404 and also generates features like "great_adj" and "positive_dictionary" by the PoS sub-component 400 and the dictionary sub-component 402, respectively. In this case, the features "great_adj" and "positive_dictionary" do not help the sentiment analysis and may be removed if desired.

As noted above, other optional sub-components may be employed to further refine the features 114 provided by the sub-components described above. The filter sub-component 408, for example, includes one or more stop lists as known in the art to exclude certain features. Alternatively or additionally, features that occur infrequently or that occur in too few units of the training data 106 can be filtered out. For example, if the feature "negated_great" only occurs in three out of 1,000 units of the training data 106, the feature may be removed by the filter sub-component 408 and will not be analyzed further.

Finally, all the features 114 that are provided by the PoS sub-component 400, the dictionary sub-component 402, and the negation/inversion sub-component 404 and refined by the filter sub-component 408 are stored in a suitable storage device for further process.

Figure 5:
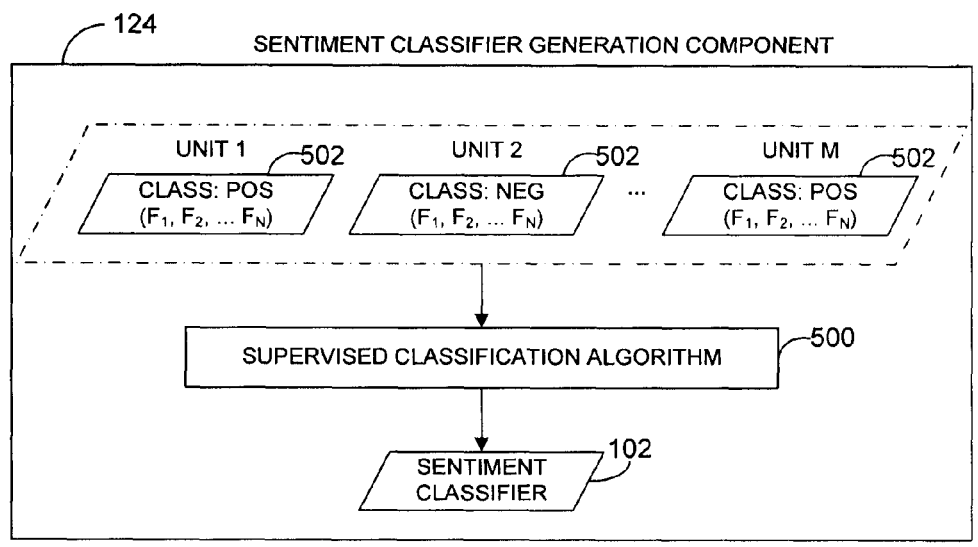
FIG. 5 is a block diagram illustrating the sentiment classifier generation component of FIG. 1 in greater detail in accordance with the instant disclosure.

Referring now to FIG. 5, a block diagram of the sentiment classifier generation component 124 of FIG. 1 is illustrated in greater detail. In particular, the sentiment classifier generation component 124 includes a supervised classification algorithm 500, which analyzes a set of input objects 502 obtained from the training data 106 and produces the one or more sentiment classifiers 102. The set of input objects 502 may be represented in various ways, such as feature-value pairs 118 as descried before with reference to FIG. 1, based on the specific supervised classification algorithm 500. As known in the art, the accuracy of the sentiment classifier 102 depends strongly on how the input objects are represented. Typically, the input objects 502 are transformed into a set of feature vectors, which contains a number of features that are descriptive of the object. In order to keep complexity manageable, the number of features should not be too large, but should contain enough information to accurately predict the output. In an embodiment as shown in FIG. 5, each input object 502 corresponds to one unit of the labeled training data 122 and includes the sentiment class of the unit (e.g., "positive", "negative") and a feature vector of the unit. For example, unit 1 may be a document that is labeled with the "positive" sentiment class by a human expert or by the class labeling component 120. n number of features are extracted from unit 1 by the feature extraction component 112, and the values of each feature are determined by the feature value determination component 118. Accordingly, all the features extracted from unit 1 are represented by a vector ($F_1, F_2, \ldots F_n$), and such vector belongs to the sentiment class "positive". As shown in FIG. 5, suppose the training data 106 include m number of units, then these units may be represented as m input objects 502 each including a feature vector and a sentiment class. It is understood that, however, any other suitable representation of the input objects 502 may be used as known in the art.

Various supervised classification algorithms 500 are known in the art, such as but not limited to, SVM, decision trees, naïve Bayes, linear discriminant analysis, logistic regression, or artificial neural network. In an embodiment, the supervised classification algorithm 500 employs the SVM method. The SVM method takes a set of input data and predicts, for each given input, which of two possible classes the input is a member of, which makes the SVM a non-probabilistic binary linear classifier. In most sentiment analyses, two sentiment classes—"positive" and "negative"—are employed, thereby making SVM a suitable method for sentiment classification. As a supervised classification algorithm, and given a set of training examples each marked as belonging to one of two categories, an SVM training algorithm builds a model that predicts whether a new example falls into one category or the other. Intuitively, an SVM model is a representation of the examples as points in space, mapped so that the examples of the separate categories are divided by a clear gap that is as wide as possible. New examples are then mapped into that same space and predicted to belong to a category based on which side of the gap they fall on. Thus, where the supervised classification algorithm 500 implements SVM, the input objects 502 (i.e., the M units comprising feature vectors) are used to create a representation of "positive" and "negative" classifications that may be used to predict the sentiment of subsequently input objects that are also represented as feature vectors.

Figure 6:
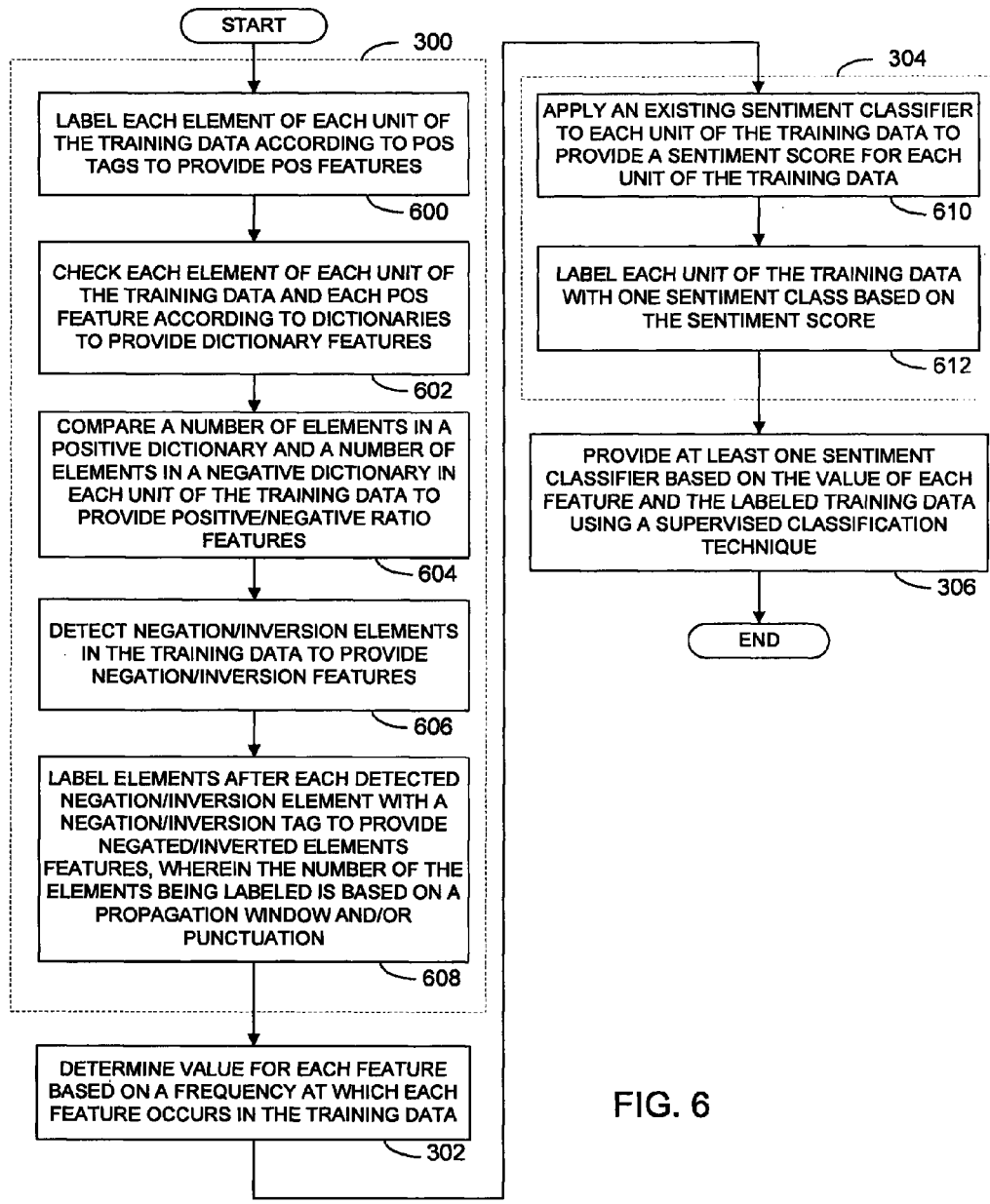
FIG. 6 is a flow chart illustrating the method for providing sentiment classifiers of FIG. 3 in greater detail in accordance with the instant disclosure.

Referring now to FIG. 6, a flow chart illustrating an embodiment for providing sentiment classifiers of FIG. 3 is provided in greater detail. Beginning at block 600, each element of each unit of the training data is labeled according to a plurality of PoS tags to provide a plurality of PoS features. As noted above, the elements may be words and/or phrase in the training data, and the PoS tags may include verb tag, adjective tag, adverb tag, noun tag, or any suitable PoS tags. The operation of block 600 may cause adding of a new PoS feature if such PoS feature has not been extracted from the training data yet or changing of the value of an existing PoS feature that has already been extracted. At block 602, each element of each unit of the training data and each PoS feature of the plurality of PoS features are checked according to a plurality of dictionaries to provide a plurality of dictionary features, as noted above. Likewise, the operation of block 602 may cause adding of a new dictionary feature if such dictionary feature has not been extracted from the training data yet or changing of the value of an existing dictionary feature that has already been extracted. Proceeding to block 604, a number of elements in a positive dictionary and a number of elements in a negative dictionary are compared in each unit of the training data to provide a plurality of positive/negative ratio features. Depending on the level at which the training data is divided into units, the operation of block 604 may be performed at the document level, paragraph level, or sentence level, and different positive/negative ratio features may be provided based on the level and/or the result of the comparison. Moving to block 606, a plurality of negation/inversion elements in the training data are detected to provide a plurality of negation/inversion features based on a negation dictionary and an inversion dictionary. The negation/inversion elements are detected by matching one or more words and/or phrases in the negation and inversion dictionaries. The negation/inversion features are provided based on the positive matching of the search, and the value of the negation/inversion features may be determined based on the number of matching occurrences. At block 608, in addition to the negation/inversion features, each element of a plurality of elements after each detected negation/inversion element is labeled with a negation/inversion tag to provide a plurality of negated/inverted elements features. As noted above, the number of elements being labeled is based on a propagation window and punctuation after the detected negation/inversion element.

Blocks 610 and 612 illustrate an example embodiment of providing labeled training data at block 304 by the class labeling component 120. In this embodiment, each unit of the training data is applied to an existing sentiment classifier to provide a sentiment score for each unit of the training data at block 610. The score represents the possibility of the training data belonging to one of the sentiment classes. The score is then used at block 612 to label each unit of the training data with one sentiment class. For example, a score "−5.3" may cause one unit of the training data to be labeled with a "negative" sentiment class, while a score "+1.8" may fall into the category of "positive" sentiment class. It is understood that, however, blocks 610 and 612 only illustrate one example of automatically labeling the training data using existing sentiment classifiers by the class labeling component 120, and other examples such as manually labeling by a user or a human expert may also be employed if desired.

Although the processing blocks of FIG. 6 are illustrated in a particular order, those having ordinary skill in the art will appreciate that the processing can be performed in different orders. In one example, blocks 610 and 612 may be performed prior to blocks 600, 602, 604, 606, and 608. That is, the training data may be labeled with sentiment classes before the features being extracted from the training data. In another example, blocks 600-608, and 302 may be performed essentially simultaneously. In other words, various types of features may be extracted at the same time through different operations, and their values may be also determined as soon as the features are extracted from the training data.

Figure 7:
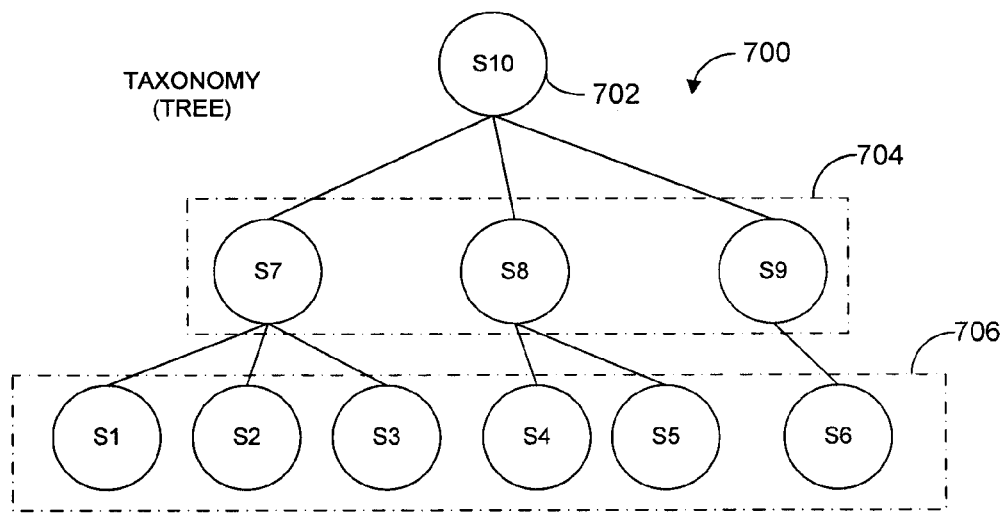
FIG. 7 is an illustration of tree taxonomy of sentiment classifiers in accordance with an embodiment of the instant disclosure.
Figure 8:
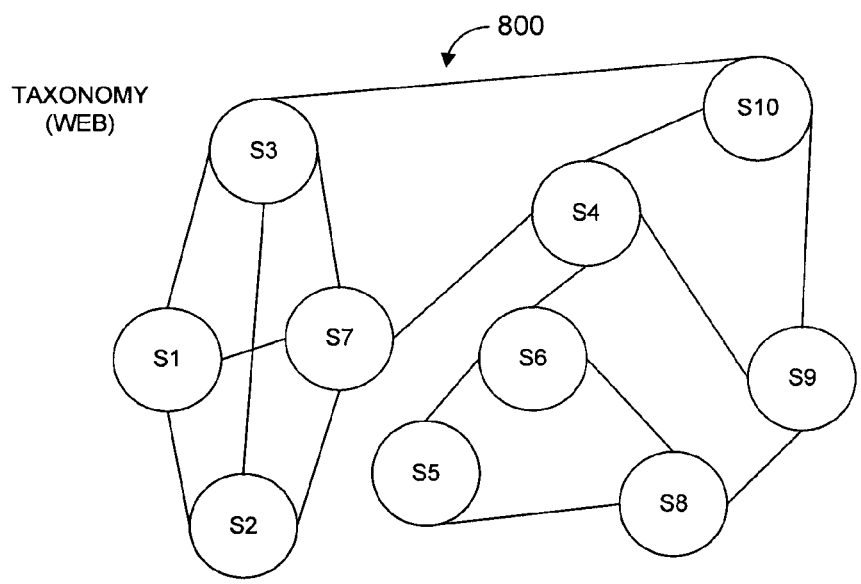
FIG. 8 is an illustration of web taxonomy of sentiment classifiers in accordance with another embodiment of the instant disclosure.
Figure 9:
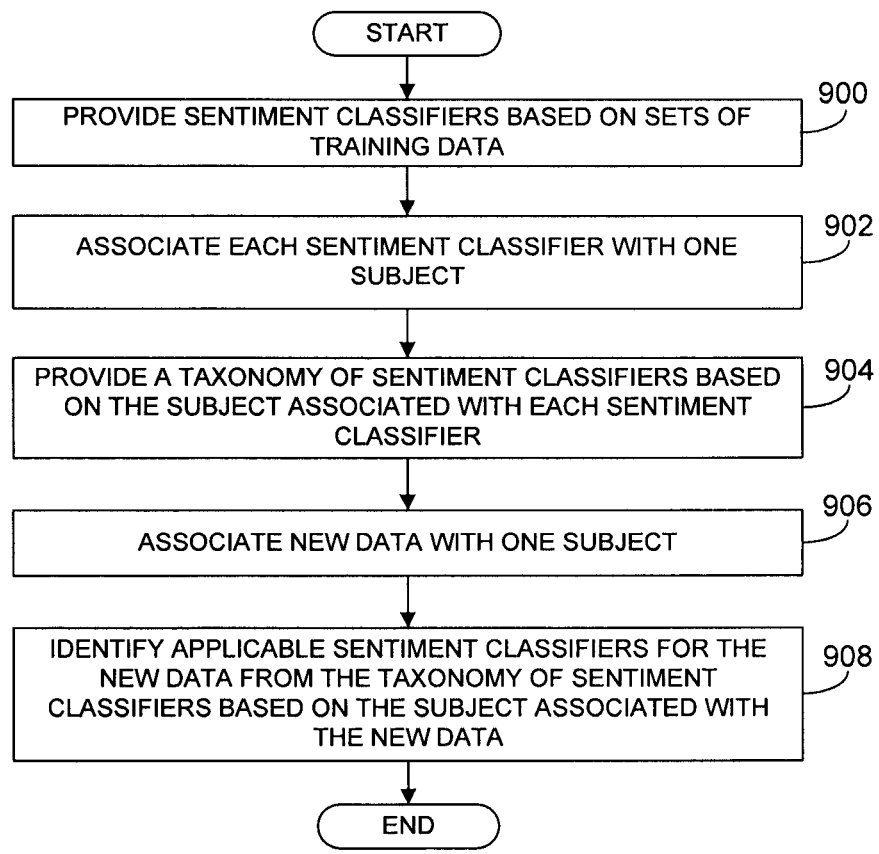
FIG. 9 is a flow chart illustrating a method for providing taxonomy of sentiment classifiers in accordance with the instant disclosure.

FIGS. 7, 8, and 9 illustrate providing taxonomy of sentiment classifiers in accordance with an embodiment of the instant disclosure. Referring now to FIGS. 7 and 8, examples of taxonomy of sentiment classifiers 104 in accordance with the instant disclosure are provided. As described above, more than one sentiment classifiers 102 may be provided by the sentiment classifier generation component 124 and form a taxonomy based on their associated subjects. Various structures or organizations of taxonomy may be employed in the instant disclosure. FIG. 7 illustrates an example of a tree taxonomy 700 that includes a top node 702, a plurality of middle nodes 704, and a plurality of bottom nodes 706. Each node of the tree taxonomy 700 represents one sentiment classifier 102. It is understood that the actual number and levels of nodes in the tree taxonomy 700 may vary, but at least one top node and two bottom nodes are usually necessary for a meaningful tree taxonomy.

As described above with reference to FIG. 1, in order to form the tree taxonomy 700, the taxonomy generation component 126 associates each sentiment classifier 102 with one of the plurality of subjects. As shown in FIG. 7, each node (i.e., sentiment classifier) is associated with subject S1 to S10, respectively. The tree taxonomy 700 is organized based on the relationship between the subjects associated with each node. For example, suppose the sets of training data used to provide the sentiment classifiers S1, S2, and S3 are online product reviews of "scarves", "gloves" and "belts", respectively; that the sets of training data used to provide sentiment classifier S7 are more general online product reviews of "accessories"; and, finally, that the sets of data used to provide sentiment classifier S10 are yet more general online product reviews of "apparel". Accordingly, the subjects associated with the sentiment classifiers follow the subjects of the corresponding training data: sentiment classifier S1 concerns "scarves", sentiment classifier S2 concerns "gloves", sentiment classifier S3 concerns "belts", sentiment classifier S7 concerns "accessories" and sentiment classifier S10 concerns "apparel". Note that the respective classifiers become increasingly generalized from the bottom-most nodes 706 to the top node 702. In other words, in case of the tree taxonomy 700, the taxonomy generation component 126 aggregates at least some of the plurality of sentiment classifiers (e.g., S1, S2, S3) to form another sentiment classifier (e.g., S7) based on the subjects associated with the at least some of the plurality of sentiment classifiers.

In another embodiment with reference to FIG. 8, a web taxonomy 800 is provided by the taxonomy generation component 126. Different from the hierarchical structure of the tree taxonomy 700, all the nodes in the web taxonomy 800 are at the same level and thus, there are no top node or bottom nodes in the web taxonomy 800. In addition, each node in the tree taxonomy 700 is only connected to its upper node and/or its lower nodes, while in the web taxonomy 800, each node may be connected to (associated with) any number of other nodes based on the relevancy of their associated subjects. For example, given their related subjects, the sentiment classifiers S1, S2, S3, and S7 are all connected with each other in the web taxonomy 800.

As described above with reference to FIG. 1, after forming the taxonomy of the sentiment classifiers 104, the identification component 128 may be used to identify one or more applicable sentiment classifiers 108 from the taxonomy of sentiment classifiers 104 for any new data 110 to be analyzed based on the subject associated with the new data 110. For example, the new data 110 may be one or more online product reviews of a new belt, and the apparatus 100 is used to perform the sentiment analysis of the new data 110 to determine the customer satisfaction of the new belt. Since more than one sentiment classifiers 102 may have been provided by the apparatus 100, it is desired to identify which one or more sentiment classifiers are applicable for analyzing the new data 110. The taxonomy of sentiment classifiers 104 provides an efficient way to identify all the applicable sentiment classifiers 108.

Referring back to FIG. 7, if the sentiment classifiers 102 are organized in the tree taxonomy 700, the subject associated with the new data 110 can be traversed from a bottom node to the top node. In the same example mentioned above, S3 "belts" is identified as the first applicable sentiment classifier 108 for the new data 110 due to the matching of their subjects. Since S3 "belts" is connected to its upper node S7 "accessories", the identification component 128 then identifies that S7 "accessories" is another applicable sentiment classifier 108 since its associated subject "accessories" is also related to the subject "belt" of the new data 110. Likewise, the identification component 128 finally reaches the top node S10 "apparel" of the tree taxonomy 700 and determines that the top node S10 "apparel" is still an applicable sentiment classifier 108. Accordingly, three applicable sentiment classifiers (S3, S7, and S10) are identified in this example for analyzing the new data 110. Referring now to FIG. 8, if the sentiment classifiers 102 are organized in the web taxonomy 800, once the identification component 128 identifies the first applicable sentiment classifier, it will follow all the connections from the identified node to determine whether each of its connected nodes is also applicable for the new data 110 based upon relevance determinations of their associated subjects.

Referring now to FIG. 9, a flow chart illustrating a method for providing and using a taxonomy of sentiment classifiers is provided in accordance with the instant disclosure. Beginning at block 900, a plurality of sentiment classifiers are provided based on a plurality of sets of training data, which are associated with a plurality of subjects. Each sentiment classifier is then associated, at block 902, with one subject. The subject associated with a specific sentiment classifier is preferably the same as the subject associated with the training data that is used to provide the specific sentiment classifier. For example, if the training data is sport news, then the training data is associated with subject "sport", and the sentiment classifier provided based on the sports news is also associated with the subject "sport". Proceeding to block 904, a taxonomy of sentiment classifiers is then provided based on the subject associated with each sentiment classifier. As described above, various types of taxonomy may be applied such as tree taxonomy, web taxonomy, to name a few. Regardless, the taxonomy is organized based on the relationship of the subjects associated with the sentiment classifiers. In an embodiment, sentiment classifiers that are associated with related subjects may be aggregated to form another sentiment classifier. As described above, blocks 900, 902, and 904 may be performed by the taxonomy generation component 126.

The relationship of the subjects associated with the sentiment classifiers may be identified in various ways. In one example, this can be done manually by human experts based on existing taxonomy templates. In another example, similarity between two or more sentiment classifiers may be determined automatically by comparing their extracted features. The similarity then may be used to provide a taxonomy by adding new sentiment classifiers to an existing taxonomy based on their similarity with the existing sentiment classifiers. The similarity between two or more sentiment classifiers may be determined by comparing their extracted features. For example, a Hellinger metric or distance, as known in the art, can be calculated based on the extracted features being compared. Of course, other suitable metrics known in the art may be employed, such as cosine similarity, Jaccard index, Dice coefficient, KL divergence, root mean square error, etc. Regardless of the metric employed, increasingly lower distances or differences as evaluated by the metric correspond to increasingly favorable comparisons. Once the most similar existing sentiment classifier(s) is identified from the taxonomy, the new sentiment classifier may be added into the hierarchy accordingly. For example, to provide a tree taxonomy, a new sentiment classifier S3 "belts" may be determined to be the most similar to the existing sentiment classifiers S1 "scarves" and S2 "gloves". Then the new sentiment classifier S3 is added onto the same level of S1, S2 in the hierarchy and under the same upper node (S7 "accessories") of S1, S2. Details of techniques for determining similarity between sentiment classifiers is disclosed in co-pending U.S. patent application having Ser. No. 13/179,741 filed on even data herewith and incorporated herein in its entirety.

The provided taxonomy at block 904 may be used to identify all applicable sentiment classifiers for given new data to be analyzed. Thus, at block 906, the new data to be analyzed is associated with one of the plurality of subjects. The association may be made by a user, a human expert, or any other suitable means. Moving to block 908, one or more applicable sentiment classifiers are identified for the new data from the taxonomy of sentiment classifiers based on the subject associated with the new data. Since each node of the taxonomy is connected to at least one of the other nodes according to the relevancy of their associated subjects, therefore, the operation of block 908 may be achieved by traversing the taxonomy and identifying all applicable sentiment classifiers based on the associated subjects using any known relevance determination techniques. As described above, blocks 906 and 908 may be performed by the identification component 128.

Although the units of training data are described as documents, paragraphs, or sentences in the exemplary embodiments above, it is understood that, however, they may be contexts around a phrase as well. In an embodiment, essentially the same apparatus and method described above are applied on the basis of phrases based on the contexts in which the phrase is found. In this embodiment, the context around the phrase may be determined by the preprocessing sub-component 406 based on a predefined propagation window and certain punctuation characters, which is similar to the technique noted above with reference to block 608 in FIG. 6. The determined context around the phrase then goes into the feature extraction component 112 as input, and the sentiment classes are labeled to each context around the phase by a user, a human expert, or the class labeling component 120.

While particular embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for at least one processing device to provide at least one sentiment classifier based on a plurality of features, the method comprising:
    extracting, by the at least one processing device, a plurality of features from training data comprising a plurality of units by:
        labeling at least one element of each unit of the training data according to a plurality of part-of-speech (PoS) tags to provide PoS features;
        checking at least one element of each unit of the training data according to a plurality of dictionaries to provide dictionary features;
        detecting a plurality of negation/inversion elements in the training data to provide a plurality of negation/inversion features based on a negation dictionary and an inversion dictionary of the plurality of dictionaries;
        labeling at least one element after each of the plurality of negation/inversion features to provide negated/inverted elements features based on at least one of a propagation window or punctuation in the training data;
    determining, by the at least one processing device, a value for each feature of the plurality of features based on a frequency at which each feature occurs in the training data;
    labeling, by the at least one processing device, each unit of the training data according to a plurality of sentiment classes to provide labeled training data; and
    providing, by the at least one processing device, the at least one sentiment classifier based on the value of each feature of the plurality of features and the labeled training data using a supervised classification technique.

2. The method of claim 1, wherein extracting the plurality of features further comprises:
    checking each of the PoS features according to the plurality of dictionaries to provide the dictionary features.

3. The method of claim 1, wherein extracting the plurality of features further comprises:
    comparing a number of elements in a positive dictionary of the plurality of dictionaries and a number of elements in a negative dictionary of the plurality of dictionaries in each unit of the training data to provide positive/negative ratio features.

4. The method of claim 1, wherein labeling each unit of the training data comprises:
    applying an existing sentiment classifier to each unit of the training data to provide a sentiment score for each unit of the training data; and
    labeling each unit of the training data with one of the plurality of sentiment classes based on the sentiment score.

5. The method of claim 1, wherein the training data comprises a plurality of documents.

6. The method of claim 1, wherein the training data comprises a plurality of contexts around a phase.

7. The method of claim 1, further comprising:
    providing a plurality of sentiment classifiers based on a plurality of sets of training data, the plurality of sets of training data being associated with a plurality of subjects;
    associating each sentiment classifier of the plurality of sentiment classifiers with one of the plurality of subjects; and
    providing a taxonomy of sentiment classifiers based on a subject, of the plurality of subjects, associated with each sentiment classifier of the plurality of sentiment classifiers.

8. The method of claim 7, wherein providing the taxonomy of sentiment classifiers comprises:
    aggregating at least some of the plurality of sentiment classifiers to form another sentiment classifier based on the plurality of subjects associated with the at least some of the plurality of sentiment classifiers.

9. The method of claim 7, further comprising:
    associating new data with one of the plurality of subjects; and
    identifying one or more applicable sentiment classifiers for the new data from the taxonomy of sentiment classifiers based on a subject associated with the new data.

10. An apparatus operable to provide at least one sentiment classifier based on a plurality of features, the apparatus comprising:
    a feature extraction component, implemented by at least one processing device, operable to extract the plurality of features from training data, wherein the training data comprises a plurality of units, the feature extraction component comprising:
        a part-of-speech (PoS) sub-component operable to label at least one element of each unit of the training data according to a plurality of PoS tags to provide PoS features;
        a dictionary sub-component operable to:
            check at least one element of each unit of the training data according to a plurality of dictionaries to provide dictionary features; and
        a negation/inversion sub-component operable to detect a plurality of negation/inversion elements in the training data to provide a plurality of negation/inversion features based on a negation dictionary and an inversion dictionary of the plurality of dictionaries, and operable to label at least one element after each of the plurality of negation/inversion features to provide negated/inverted elements features based on at least one of a propagation window or punctuation in the training data;

a feature value determination component, implemented by the at least one processing device and operatively connected to the feature extraction component, operable to determine a value for each feature of the plurality of features based on a frequency at which each feature occurs in the training data;

a class labeling component, implemented by the at least one processing device, operable to label each unit of the training data according to a plurality of sentiment classes to provide labeled training data; and a sentiment classifier generation component, implemented by the at least one processing device and operatively connected to the feature value determination component and the class labeling component, operable to provide the at least one sentiment classifier based on the value of each feature of the plurality of features and the labeled training data using a supervised classification technique.

11. The apparatus of claim 10, wherein the dictionary sub-component is further operable to:
check each of the PoS features according to the plurality of dictionaries to provide the dictionary features.

12. An apparatus operable to provide at least one sentiment classifier based on a plurality of features, the apparatus comprising:
a feature extraction component, implemented by at least one processing device, operable to extract the plurality of features from training data, wherein the training data comprises a plurality of units, the feature extraction component comprising:
a part-of-speech (PoS) sub-component operable to label at least one element of each unit of the training data according to a plurality of PoS tags to provide PoS features;
a dictionary sub-component operable to:
check at least one element of each unit of the training data according to a plurality of dictionaries to provide dictionary features; and
compare a number of elements in a positive dictionary of the plurality of dictionaries and a number of elements in a negative dictionary of the plurality of dictionaries in each unit of the training data to provide a plurality of positive/negative ratio features; and
a negation/inversion sub-component operable to detect a plurality of negation/inversion elements in the training data to provide a plurality of negation/inversion features based on a negation dictionary and an inversion dictionary of the plurality of dictionaries, and operable to label at least one element after each of the plurality of negation/inversion features to provide negated/inverted elements features;

a feature value determination component, implemented by the at least one processing device and operatively connected to the feature extraction component, operable to determine a value for each feature of the plurality of features based on a frequency at which each feature occurs in the training data;

a class labeling component, implemented by the at least one processing device, operable to label each unit of the training data according to a plurality of sentiment classes to provide labeled training data; and a sentiment classifier generation component, implemented by the at least one processing device and operatively connected to the feature value determination component and the class labeling component, operable to provide the at least one sentiment classifier based on the value of each feature of the plurality of features and the labeled training data using a supervised classification technique.

13. The apparatus of claim 10, wherein the class labeling component is further operable to:
apply an existing sentiment classifier to each unit of the training data to provide a sentiment score for each unit of the training data; and
label each unit of the training data with one of the plurality of sentiment classes based on the sentiment score.

14. The apparatus of claim 10, wherein the training data comprises a plurality of documents.

15. The apparatus of claim 10, wherein the training data comprises a plurality of contexts around a phase.

16. The apparatus of claim 10, further comprising:
a taxonomy generation component, implemented by the at least one processing device and operatively connected to the sentiment classifier generation component, operable to:
provide a plurality of sentiment classifiers based on a plurality of sets of training data, the plurality of sets of training data being associated with a plurality of subjects;
associate each sentiment classifier of the plurality of sentiment classifiers with one of the plurality of subjects; and
provide a taxonomy of sentiment classifiers based on a subject, of the plurality of subjects, associated with each sentiment classifier of the plurality of sentiment classifiers.

17. The apparatus of claim 16, wherein the taxonomy generation component is further operable to:
aggregate at least some of the plurality of sentiment classifiers to form another sentiment classifier based on the plurality of subjects associated with the at least some of the plurality of sentiment classifiers.

18. The apparatus of claim 16, further comprising:
an identification component, implemented by the at least one processing device and operatively connected to the taxonomy generation component, operable to:
associate new data with one of the plurality of subjects; and
identify one or more applicable sentiment classifiers for the new data from the taxonomy of sentiment classifiers based on a subject associated with the new data.

19. An apparatus operable to provide at least one sentiment classifier based on a plurality of features, the apparatus comprising:
a processor; and
a storage device, operatively connected to the processor, and having stored thereon instructions that, when executed by the processor, cause the processor to:
extract the plurality of features from training data, wherein the training data comprises a plurality of units, and wherein those instructions that cause the processor to extract the plurality of features are further operative to cause the processor to:
label at least one element of each unit of the training data according to a plurality of part-of-speech (PoS) tags to provide PoS features;
check at least one element of each unit of the training data according to a plurality of dictionaries to provide dictionary features;

detect a plurality of negation/inversion elements in the training data to provide a plurality of negation/inversion features based on a negation dictionary and an inversion dictionary of the plurality of dictionaries; and label at least one element after each of the plurality of negation/inversion features to provide negated/inverted elements features based on at least one of a propagation window or punctuation in the training data;

determine a value for each feature of the plurality of features based on a frequency at which each feature occurs in the training data;

label each unit of the training data according to a plurality of sentiment classes to provide labeled training data; and provide the at least one sentiment classifier based on the value of each feature of the plurality of features and the labeled training data using a supervised classification technique.

20. The apparatus of claim 19, wherein those instructions that cause the processor to extract the plurality of features are further operative to cause the processor to:

check each of the PoS features according to the plurality of dictionaries to provide the dictionary features.

21. The apparatus of claim 19, the storage device further comprising instructions that, when executed by the processor, cause the processor to:

compare a number of elements in a positive dictionary of the plurality of dictionaries and a number of elements in a negative dictionary of the plurality of dictionaries in each unit of the training data to provide a plurality of positive/negative ratio features.

22. The apparatus of claim 19, the storage device further comprising instructions that, when executed by the processor, cause the processor to:

apply an existing sentiment classifier to each unit of the training data to provide a sentiment score for each unit of the training data; and label each unit of the training data with one of the plurality of sentiment classes based on the sentiment score.

23. The apparatus of claim 19, wherein the training data comprises a plurality of documents.

24. The apparatus of claim 19, wherein the training data comprises a plurality of contexts around a phase.

25. The apparatus of claim 19, the storage device further comprising instructions that, when executed by the processor, cause the processor to:

provide a plurality of sentiment classifiers based on a plurality of sets of training data, the plurality of sets of training data being associated with a plurality of subjects;

associate each sentiment classifier of the plurality of sentiment classifiers with one of the plurality of subjects; and provide a taxonomy of sentiment classifiers based on a subject, of the plurality of subjects, associated with each sentiment classifier of the plurality of sentiment classifiers.

26. The apparatus of claim 25, the storage device further comprising instructions that, when executed by the processor, cause the processor to:

aggregate at least some the plurality of sentiment classifiers to form another sentiment classifier based on the plurality of subjects associated with the at least some of the plurality of sentiment classifiers.

27. The apparatus of claim 25, the storage device further comprising instructions that, when executed by the processor, cause the processor to:

associate new data with one of the plurality of subjects; and identify one or more applicable sentiment classifiers for the new data from the taxonomy of sentiment classifiers based on a subject associated with the new data.

* * * * *